US007493614B2

(12) United States Patent
Liu et al.

(10) Patent No.: US 7,493,614 B2
(45) Date of Patent: Feb. 17, 2009

(54) SYSTEM ARCHITECTURE AND RELATED METHODS FOR DYNAMICALLY ADDING SOFTWARE COMPONENTS TO EXTEND FUNCTIONALITY OF SYSTEM PROCESSES

(75) Inventors: Min Liu, Redmond, WA (US); Issa Khoury, Redmond, WA (US); Andrei Kozlov, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 799 days.

(21) Appl. No.: 10/404,985

(22) Filed: Mar. 31, 2003

(65) Prior Publication Data

US 2004/0193599 A1 Sep. 30, 2004

(51) Int. Cl.
*G06F 9/445* (2006.01)
(52) U.S. Cl. ..................................................... 717/175
(58) Field of Classification Search ......... 717/168–178; 709/203, 219, 223, 229, 217, 226; 715/777, 715/724, 764, 854; 719/328; 707/3, 10, 707/200

See application file for complete search history.

(56) References Cited

U.S. PATENT DOCUMENTS

| 6,304,967 | B1 * | 10/2001 | Braddy ........................ 713/150 |
| 6,310,941 | B1 * | 10/2001 | Crutcher et al. ........... 379/88.17 |
| 6,370,686 | B1 | 4/2002 | Delo |
| 6,683,696 | B1 * | 1/2004 | Urie et al. .................... 358/1.15 |
| 6,868,448 | B1 * | 3/2005 | Gupta et al. ................. 709/226 |
| 6,957,199 | B1 * | 10/2005 | Fisher .......................... 705/78 |
| 7,096,368 | B2 * | 8/2006 | Kouznetsov et al. ........ 713/189 |
| 2004/0107245 | A1 * | 6/2004 | Bodnar ......................... 709/203 |
| 2004/0148362 | A1 * | 7/2004 | Friedman et al. ............ 709/217 |
| 2005/0198189 | A1 * | 9/2005 | Robinson et al. ............ 709/217 |

FOREIGN PATENT DOCUMENTS

EP    0 911 728 A    4/1999

OTHER PUBLICATIONS

MSDN2, "How to Use the Microsoft Office Converter Pack", New Tools for the Conversion Process, Mar. 5, 1999, URL: http://msdn2.microsoft.com/en-us/library/aa833091(office.10).aspx http://msdn2.mircosoft.com/enus/library/aa832908(office.10).aspx, pp. 1-11.*

(Continued)

*Primary Examiner*—Tuan Anh Vu
(74) *Attorney, Agent, or Firm*—Klarquist Sparkman, LLP

(57) ABSTRACT

Systems and methods are described herein for automatically installing and using media processing filters to extend the media functionality of system processes. A system service is requested by the add-in filter to be installed on the system. The filter management service processes the request and installs the filters to be invoked later by other system processes such as device drivers, applications and acquisition software. The system processes use the filter management service to enumerate filters available on the system and select one or more of the filters to extend their media functionality. The filters are objects that may be used by multiple processes at any given time. Also, the filter management service can validate trustworthiness of a filter prior to installing the filter on the system. Additionally, the filter management service can be used to provide selected filters to be invoked from a process separate from the process requesting the filter for use. The installed filters may be searched and enumerated according to their associated categories.

34 Claims, 14 Drawing Sheets

OTHER PUBLICATIONS

"Introduction of DirectShow Application Programming," MSDN Home, http://msdn.microsoft.com/library/default.asp?url=/library/en-us/directx9_c/directx/htm/introductiontodirectshowapplicationprogramming.asp, pp. 1-2, (Visited Mar. 31, 2003).

"About the Filter Graph Manager," MSDN Home, http://msdn.microsoft.com/library/default.asp?url=/library/en-us/directx9_c/directx/htm/aboutthefiltergraphmanager.asp, p. 1, (Visited Mar. 31, 2003).

"Using the Filter Mapper," MSDN Home, http://msdn.microsoft.com/library/default.asp?url=/library/en-us/directx9_c/directx/htm/filterchains.asp, pp. 1-2, (Visited Mar. 31, 2003).

"An Overview of Adobe Photoshop 7.0," http://msdn.microsoft.com/library/default.asp?url=/library/en-us/directx9_c/directx/htm/usingthefiltermapper.asp, pp. 1-6, (Visited Mar. 31, 2003).

"Mac© OS 9.1,9.2.2/Mac .OS X 10.2, Windows® 98SE/2000/Me/XP, Adobe® Photoshop ® Camera Raw & JPEG 2000 Plug-in-Bundle," http://www.adobe.com/products/photoshop/pdfs/ps_cameraraw_nfhs.pdf, pp. 1-3, (Visited Mar. 31, 2003).

"Adobe Photoshop Camera Raw plug-in—Working with raw image files in Adobe Photoshop," http://www.adobe.com/products/photoshop/pdfs/ps_cameraraw_userguide.pdf, pp. 1-9, (Visited Mar. 31, 2003).

Search Report from European Patent Application No. 03 021 331.8-2211 dated Mar. 6, 2007.

\* cited by examiner

```
DECLARE_INTERFACE_(IBitmapFilterManager, IUnknown)
{
// standard IUnknown methods (QueryInterface, AddRef, Release)
...

//
// filter categories management
//
STDMETHOD(AddCategory)(
    IN GUID CategoryID,      ~510
    IN BSTR Name,
    IN BSTR Description));

STDMETHOD(DeleteCategory)(   ~530
    IN GUID CategoryGUID));

STDMETHOD(EnumCategories)(
    DWORD dwFlags,           ~520
    OUT IEnumGUID **ppEnum));

STDMETHOD(GetCategoryName)(
    IN GUID CategoryID,
    OUT BSTR *Name,
    OUT BSTR *Description));

//
// filter management
//
STDMETHOD(InstallFilter)(
    IN GUID CategoryID,
    IN GUID FilterID,
    IN BSTR Name,            ~550
    IN BSTR Description,
    IN DWORD dwFlags));

STDMETHOD(UninstallFilter)(  ~560
    IN GUID FilterID));

STDMETHOD(EnumFilters)(
    GUID CategoryID,
    DWORD dwFlags,           ~540
    IEnumGUID **ppEnum));

STDMETHOD(GetFilterInfo)(
    IN GUID FilterID,
    OUT GUID *CategoryID,    ~570
    OUT BSTR *Name,
    OUT BSTR *Description,
    OUT DWORD *dwFlags));

SYSTEM ARCHITECTURE AND RELATED METHODS FOR DYNAMICALLY ADDING SOFTWARE COMPONENTS TO EXTEND FUNCTIONALITY OF SYSTEM PROCESSES

TECHNICAL FIELD

The technical field generally relates to computer system architecture and more particularly to operating system architecture for automatically adding software components to system processes.

BACKGROUND

With the proliferation of digital media devices such as digital audio tapes (DAT), digital video discs (DVD), digital video cameras and digital still cameras, computer users are demanding an increasing array of hardware and software capabilities to process and use digital media files. A large number of independent hardware vendors (IHVs) and independent software vendors (ISVs) have entered the market to satisfy this demand for increased media functionality. The entry of such a large number of ISVs and IHVs into the market presents many challenges to developers of operating systems and applications with media functionality. For example, the IHVs and ISVs have created a number of inconsistent formats for codecs and other filters. Currently, operating systems and applications have limited capabilities to work with multiple formats that are not widely used.

Filters are software components that are used with media files (e.g., audio, video or still images) to serve as codecs (coders or decoders), to add effects (e.g., color correction, brightness enhancement etc.) or to analyze a file's content (e.g., for extracting metadata such as the number of people in a given image file). Currently, several codec standards (e.g., JPEG, TIFF) are widely used in desk top publishing for formatting image files. Most operating systems, applications and acquisition software support such widely used standards. For example, the acquisition software named Scanner and Camera Wizard in Microsoft® Windows® Me and Microsoft® Windows® XP by Microsoft® Corporation works with scanner and digital camera devices and has the capability to decode and process TIFF files produced by the scanner and digital camera drivers.

However, some manufacturers of hardware such as digital cameras and scanners may prefer to use codecs specially designed to work with their own hardware components. For example, Nikon® Corporation prefers to use a specialized version of TIFF known as TIFF/EP format for coding and decoding digital images. However, TIFF/EP format is not widely used or supported by operating systems or image processing applications. For instance, Windows® XP operating system by Microsoft® Corporation does not support the TIFF/EP format for images. Thus, a Windows® XP desktop user will be unable to decode and view a TIFF/EP image file obtained from a Nikon® camera without installing a separate viewer application. Also, some image processing applications such as Image Viewer by Microsoft® Corporation cannot be extended to support the TIFF/EP standard because they are designed to use a standard TIFF decoder whenever a TIFF type file is presented to the application. Currently, the user may have to add a TIFF/EP codec component to their Windows XP® system and use an application specially designed to work with TIFF/EP images in order to view and enhance TIFF/EP images. Therefore, there is an increased need for operating systems to be more flexible in allowing IHVs, and ISVs to extend the capabilities of existing system processes such as device drivers, acquisition software and other applications by providing their own proprietary filters as add-ins to the system processes. Allowing the IHVs or ISVs to extend the capability of the existing applications or acquisition software will also eliminate the need to create custom applications to work with specialized filters, and instead allow the ISVs and IHVs to concentrate their efforts on providing the best filters as add-ins.

Software developers are usually wary of allowing filters developed by outside entities to be used as add-ins because any errors in the add-in filters can potentially affect the operation of their own software components. Thus, there is a need for systems and methods that adequately ensure the security of the system or the applications using the add-in filters.

Typically, filter components installed on a system either come bundled with an application or are installed to work specifically with certain selected applications. Usually, many of the other applications on the system are not capable of accessing the installed filter's functionality. Thus, there is a need for an open and flexible system architecture that allows for all processes on a system to discover and use add-in filters so that an add-in filter may even be used by unspecified applications, and device drivers.

Additionally, with the demand for increased media functionality, a wide variety of filters with multiple media functionalities are being installed and used on systems. Thus, there is a need for system architecture that is efficient in searching for and enumerating add-in filters installed and available on a system so that an application or a user (through the application) may select the appropriate add-ins as and when it is necessary.

Also, multiple filters installed on a system each may have multiple media functionalities and some of the filters may have functionalities that overlap. In some cases one or more of the filters may be particularly suited for certain type of media processing. A user or a system process may need to discover the functionality of filters before choosing an appropriate filter. One way to accomplish this would be load the filter to memory and then determine its capability. However, this can tie-up system resources and make the filter add-in process tedious and slow. Thus, there is a further need for systems and methods to categorize filters by their features and to search, discover and enumerate the filters by their categorization without loading the filter on to memory.

SUMMARY

As described herein, system architecture and methods are provided for automatically installing and invoking media processing filters to extend media related functionality of system processes such as media applications, acquisition software and device drivers.

In one aspect, the system architecture is open and flexible such that add-in filters provided by one entity can be used to extend the capability of an existing process provided by another entity. The system allows an add-in filter to use a filter management service referred to as an add-in manager system service to request itself to be installed on a system. The filter itself provides the add-in manager with information related to its functionality and the add-in manager uses the information to identifiably install the add-in filter on the system to be invoked by any of the system processes.

In another aspect, an add-in manager responds to requests by system processes to enumerate add-in filters available on a system. The processes can then select from the enumerated add-in filters to extend their own media processing capabilities. The filters may be categorized according to their functionality and features and they may be enumerated according to such categorization. In one embodiment, the add-in manager is a service that may be used by any of the processes installed on the system to extend their own media processing functionality.

In yet another aspect, add-in filters requesting to be installed are provided with security mechanisms such as digital signatures and the add-in manager validates the digital signature prior to installing the filter on the system. Furthermore, processes invoking the add-in filters may themselves request the add-in manager to only enumerate filters with selected digital signatures. Additionally, the add-in manager may be requested to use selected add-in filters in a process separate from the process requesting enumeration of add-in filters so that any errors or failure of the add-in filters cannot affect the operation of the processes requesting enumeration.

In an additional aspect, the add-in manager may enumerate multiple filters of multiple categories and the process can use the multiple filters connected together in a chain to consecutively process the media data.

Additional features and advantages of the systems and methods described herein will be made apparent from the following detailed description that proceeds with reference to the accompanying drawings.

BRIEF DESCRIPTION OF DRAWINGS

FIG. 5 is a programmatic representation of an interface to the add-in manager with methods for installing, discovering and enumerating add-in filters within a system.

DETAILED DESCRIPTION

Overview

Filters are software components used in processing media (e.g., audio, video and still images). Filters can be codecs (coders or decoders), analysis filters or enhancement filters. Examples of codecs include MPEG for video, JPEG or TIFF for digital still images and WAV or AVI for audio files. Codecs are primarily used to compress media files for efficient transmission over a network. Enhancement filters, which are also referred to as effects, are primarily used to add enhancement effects to a media file by changing image bits to improve the data or to repurpose the data (e.g., brightness enhancement for an image file, or noise reduction for an audio file). Analysis filters extract data from the image files (e.g., metadata such as color of a background in an image file). Many filters are provided as standard along with operating system software (e.g., Microsoft® Windows® XP) or with media processing applications (e.g., Adobe® Photoshop®). However, there are countless filters that serve specialized purposes that may not be supported by a particular operating system platform or applications. Among other things, the system architecture and methods described below provide for an open and flexible architecture for adding filters as add-ins to extend the capability of the existing system processes.

Figure 1:
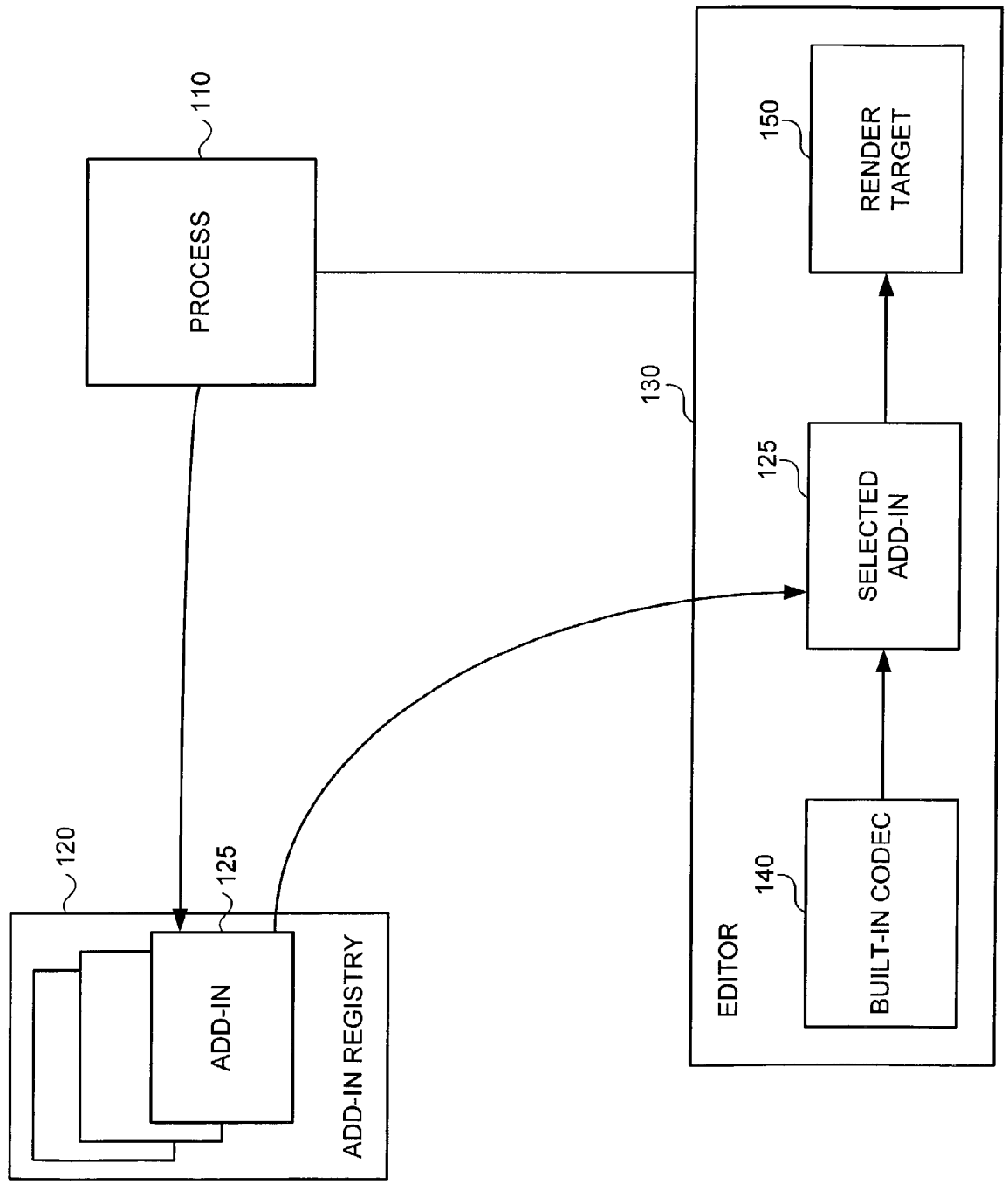
FIG. 1 is a block diagram illustrating a static method of extending media functionality of system processes by installing and using add-in filters.

FIG. 1 illustrates a static method of extending the capabilities of a system by providing add-ins to accomplish specialized tasks. In such a system, the process 110 (e.g., device drivers, applications or acquisition software) may need to be aware of available add-in filters 125 that are registered within the system registry 120. Then the process 110 can select a specific add-in filter object 125 and use an editor 130 (e.g., Filter Graph Editor by Microsoft® Corporation) to add the filter 125 with other components such as a built-in filter 140 to process the media file and provide it to a render target at 150 (e.g., display, speaker, or a file). Such a method would have to rely on the application itself being aware of the existing add-in filters 125 or have extensive code within the application itself to query the registry 120 to discover the availability of the existing filter 125. This places a significant burden on the application developers requiring them to add additional lines of code to accomplish the querying and handling of add-in filter data.

Figure 2:
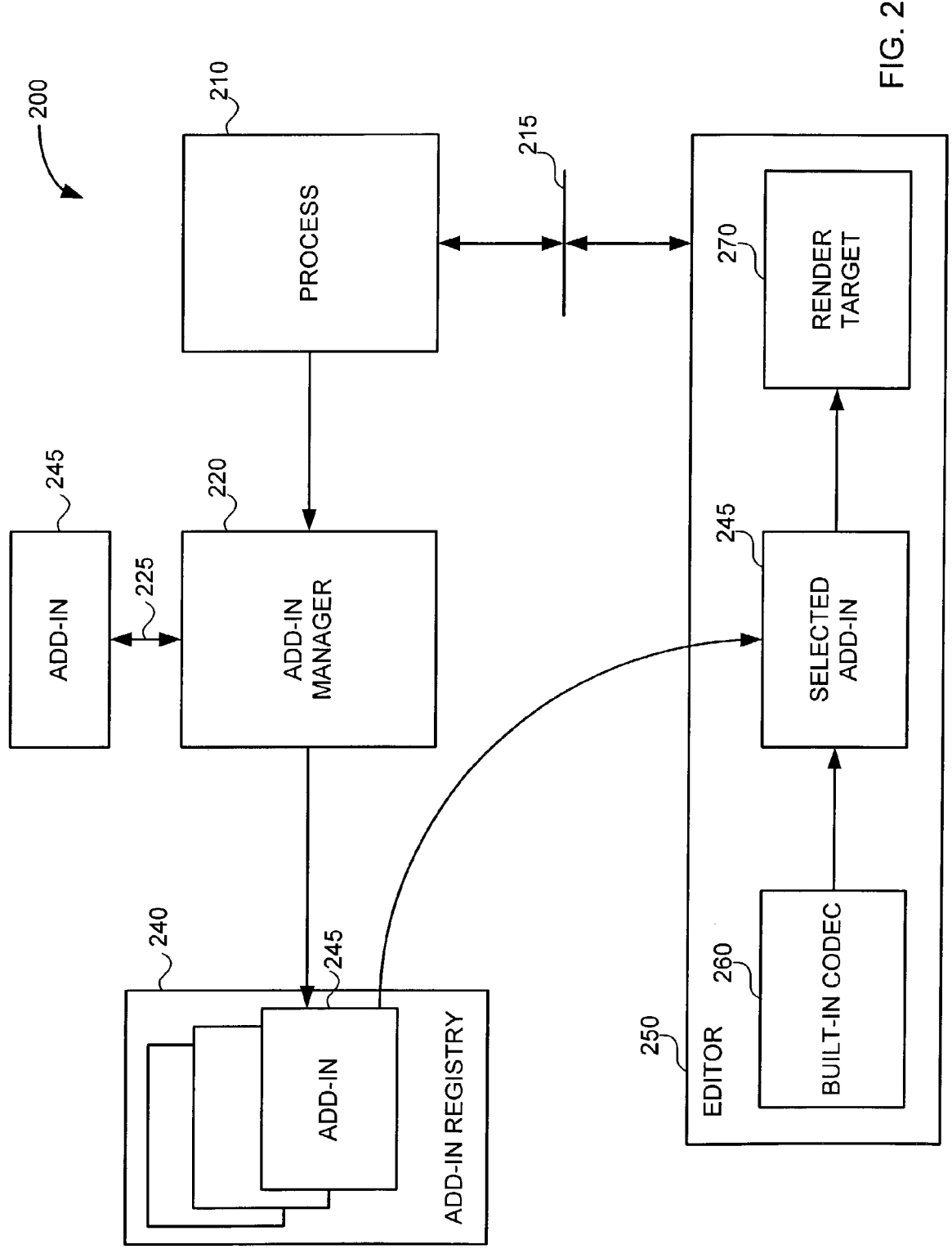
FIG. 2 is a block diagram illustrating a dynamic method of extending media functionality of system processes by automatically installing and using add-in filters.

Exemplary Overall System and Method for Dynamic Installation and Invocation of Add-in Filters FIG. 2 illustrates a more dynamic and flexible system 200 for extending the capabilities of system processes 210 with add-in filters 245. In such a system, a system service referred to here as the add-in manager 220 is provided as a component object (e.g., a Component Object Model object on Microsoft® Windows® platform) that is accessible to the entire system to serve as a node between processes 210 and the add-in filters 245. Thus, on one end, add-in filters 245 can use the add-in manager 220 to install themselves in the system at 240 and make themselves available to processes 210. On the other end, the add-in manager 220 can be used by processes 210 to discover, enumerate and provide interfaces to add-in filters such as filter 245. The process 210 may use an editor 250 to add the add-in filter 245 along with a built-in filter 260 to process a media file and provide it to a render target 270. Providing a separate system service for managing installation and provisioning of the add-in filters will not only unburden the processes 210 themselves from handling such code intensive task but also make such a service potentially available to all processes on the system that can generate calls to the add-in manager 220.

Furthermore, the overall system 200 along with the add-in manager 220 provides a reliable security model to ensure that any error prone, distrusted or un-validated filters cannot corrupt the system or cause errors within processes 210 that may use the add-in filters 245. For example, add-in manager 220 may be used to validate add-in filters 245 prior to installation or registration with the system at 225. Also, the add-in manager 220 may be used to separate the process 210 from the add-in filters 245 at 215 so that errors with add-in filters 245 are not carried over to the process 210. These and other aspects of the system 200 will be described in additional detail below.

Figure 3:
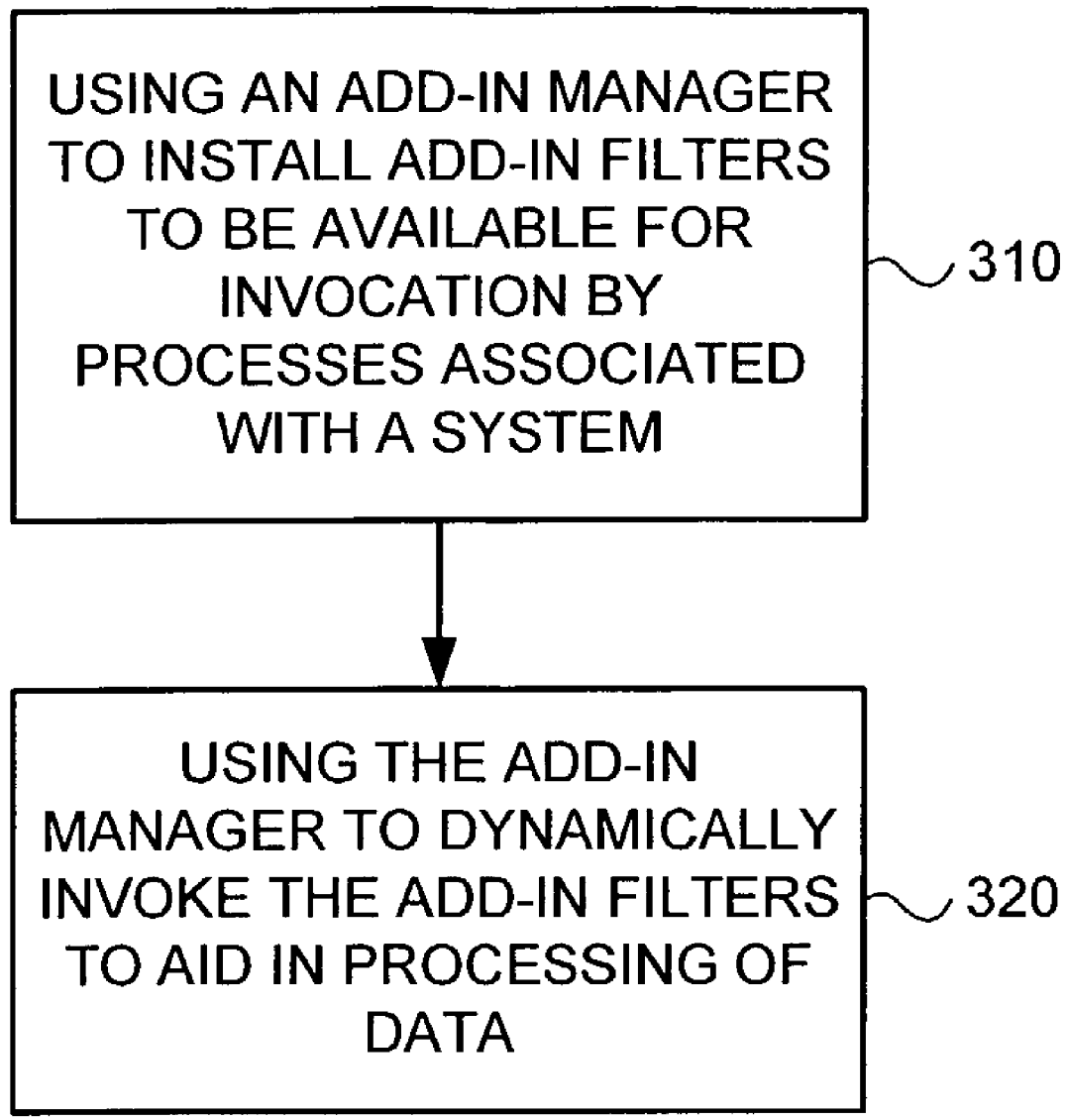
FIG. 3 is a flow chart of a method for dynamically and automatically installing and using add-in filters to extend media functionalities of system processes.

The illustrated overall system architecture of 200 and the add-in manager 220 may be used to implement a method for dynamically installing and invoking add-in filters to extend the capabilities of system processes 210. FIG. 3 illustrates one such process. At 310, the add-in manager may be used to install the add-in filter within the system to be invoked by one or more processes associated with the system. Later on at 320, the add-in manager 220 may be used to dynamically invoke add-in filters to be used by system processes. For example, the add-in manager 220 may be used to generate a request and provide an application with a list of filters meeting specific query criteria. The application can then select from the list of filters, which can be provided to the application to accomplish a specialized task.

Figure 4:
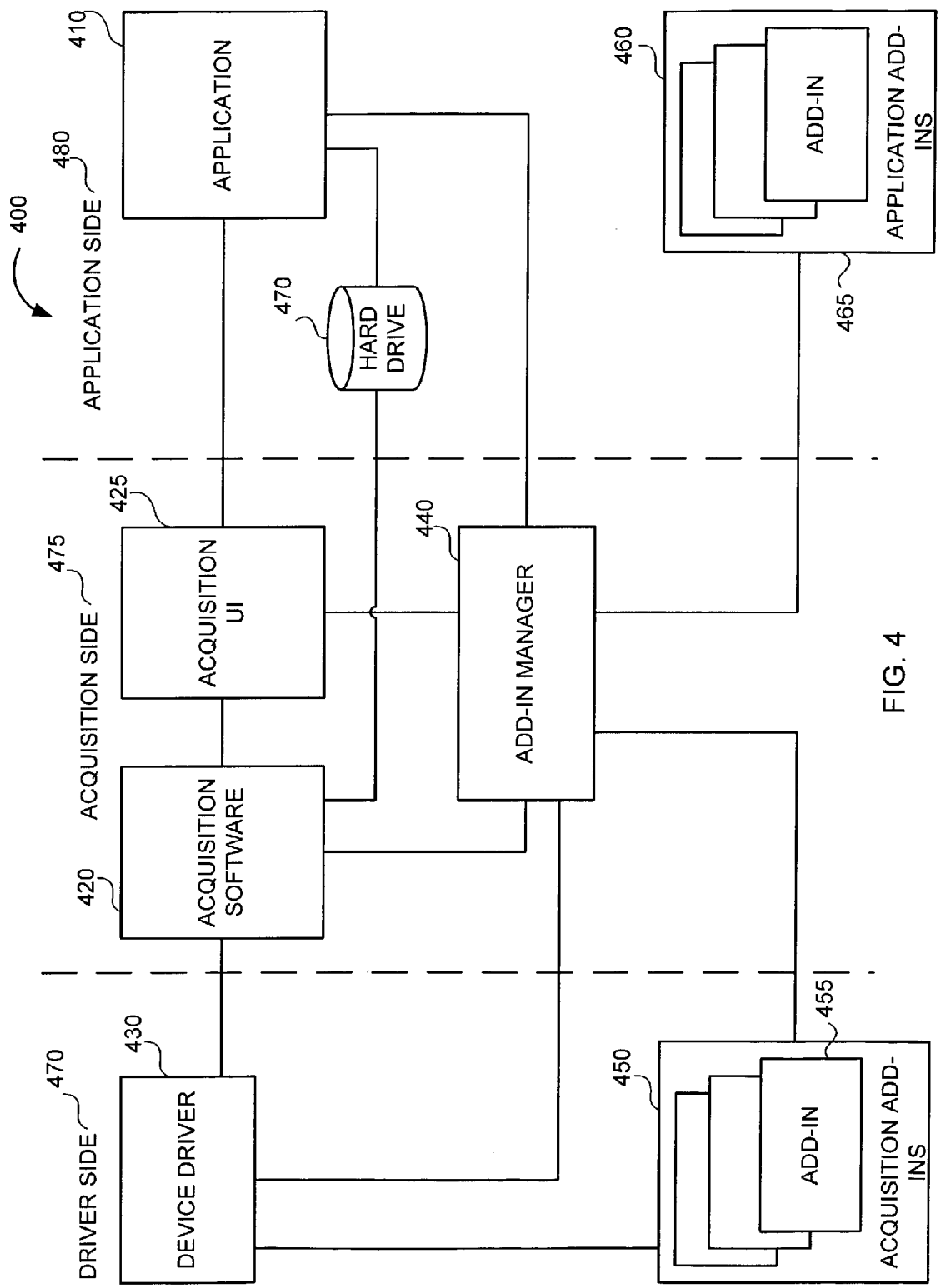
FIG. 4 is a block diagram illustrating a system architecture including an add-in manager service for dynamically and automatically installing and using add-in filters to extend media functionalities of system processes of various types.

Exemplary System Architecture with a System Service Available to Processes on a System for Installing and Invoking Add-ins FIG. 4 illustrates a system architecture with a system service for installing and invoking add-in filters. More particularly, FIG. 4 illustrates system architecture with a system service that is available for all processes of a system to discover and use add-in filters. Processes may include device drivers 430 (e.g., device driver for a particular scanner model), acquisition software 420 which can be used to process data from the device prior to storage on a hard drive 470, acquisition user interface 425 and general applications 410. The add-in manager 440 is a system wide service and may be accessed by all of these processes (e.g., 430, 420, 410 and 425). Also, the add-in filters may be provided by the IHVs, ISVs or even 3$^{rd}$ party vendors. Thus, a trusted filter provided by a 3$^{rd}$ party vendor may be used to extend a driver provided by the IHV or an application by an ISV. This flexibility will allow a user to customize their desktop to increase the media functionality of their system.

The capabilities of the device drivers 430 may be extended by using the add-in manager 440 to enumerate the add-in filters 455 available on a system and for selecting one or more of the enumerated filters to be used for a specialized task. The add-in filters on the driver side 470 may be used to process the media data without the user having any knowledge of the add-ins. For instance, if a scanner manufacturer is aware that particular models scan colored paper with dark shadows they can provide a driver side 470 add-in filter 455 to automatically correct for such defects without user's knowledge or intervention.

Furthermore, typical device drivers 430 perform tasks related to transferring media data from a device (not shown) to the applications or the operating system and also processing the data being transferred. Components of the driver 430 related to just transferring the data between a device and the system are typically the same for different device models. However, different effects or enhancement filters may be used in drivers for different device models. The components of the driver 430 related to processing media data may be implemented as add-in filters 455 and using the add-in manager 440, they may be invoked by the drivers only as and when needed. Thus, the flexible system architecture 400 allows the IHVs or driver developers to provide a standard driver without any specialized filters to be shared between multiple device models and providing the model dependent components as add-ins to extend the standard driver. Also, any upgrades or enhanced features can be provided as add-ins instead of having to provide an entirely new version of the device driver. This results in significant cost savings for maintaining the drivers.

Furthermore, the IHVs may use the add-in manager 440 to replace the functionality of similar but built-in or system default filters. For instance, the scanner acquisition software of Microsoft® Windows® XP platform recognizes the document feeder rollers of a scanner as part of the scanned image. Currently, the user has to manually correct for this by selecting an area not including the scanned rollers. However, the IHV can use the add-in manager to provide an add-in filter to replace the built-in filter and automatically remove the rollers from the scanned image.

The acquisition software 420 (e.g., Scanner and Camera Wizard by Microsoft® Corporation) is typically used to process media data as it is being transferred from the device to the system or vice versa. The acquisition software 420 can use the add-in manager 440 to extend their own capabilities much the same way as described above with regard to the drivers 430. Currently, IHVs have to provide their own acquisition software to work with a specialized filter not usually supported by standard acquisition software built-in to the operating system. However, with the system architecture 400, the acquisition software built-in to the operating system (e.g., Scanner and Camera Wizard by Microsoft® Corporation) can be extended by using the specialized filters as add-ins. Thus, the IHVs can add to the functionality of the existing acquisition software rather than replacing them.

Similarly, applications also can use the add-in manager 440 to discover, enumerate, select and use the add-in filters 465 available on a system at 460 to extend their functionality. Thus, the add-in manager 440 when implemented as a system service can increase the functionality of various processes (e.g., 410, 420, and 430) at various levels (e.g., 470, 475 and 480) of processing of the media data.

The division of typical processing of media data in a system is shown in FIG. 4 in levels (e.g., 470, 475, and 480) merely to illustrate the concept that the add-in manager 440 is a system service that can be used to extend various types of software components. Similarly, the division of add-in filters 455 and 465 into application add-ins 450 and acquisition add-ins 460 is also merely an illustrative aid and not essential for the proper functioning of the system.

Exemplary System Service for Installing and Invoking Add-in Filters

With reference to FIGS. 5, 6, 7, and 8, the functionality of add-in manager 440 will be described in more detail. The add-in manager 440 may be implemented as an object (e.g., a Component Object Model) that can be instantiated by system processes such as a device driver 420 or an application 410. Generally, the add-in manager 440 is responsible for installation and enumeration of add-in filters 455 and 465 available on a system. FIG. 5 provides an exemplary implementation of an add-in manager 440 showing various methods that a process can use to extend its capabilities and methods that filter developers may use to install their filters on the system.

Add-in filters such as 455 and 465 can be categorized by their functionality and the add-in manager is capable of searching for filters based on such categorization. The following is a possible list of standard categories of filters based on their functionality: Artistic, Artistic Effects, Blur, Blur Effects, Color, Color Effects, Sharpen, Sharpen Effects, Noise and Noise Effects. The system may have many filters registered under such standard categories, more than one filter can belong to any one category and a single filter may belong to more than one category. Sometimes, however, there are filters that cannot be classified within one of the standard categories. In that event, the method 510 can be used to add a private category by providing a unique identifier (e.g., GUID (Global Unique Identifier)) called category ID, a name and some description of the functionality of the filter. Once the filter is categorized and registered, the method 520 may be used to enumerate all categories which have at least one filter available on the system. It is also possible to modify the method 520 to simply enumerate all categories known to the system or to just enumerate the system defined categories. Furthermore, add-in manager 440 also provides methods for deleting a category. For example, the method 530 deletes a category based on an input of the unique identifier associated with the category. Deleting a category using the method of 530 may not only delete the category but also all the filters associated with the deleted category. Thus, the add-in manager 440 has the capability of managing the additions, enumeration and deleting of filters based on the categories they belong to, which may be quicker and more efficient than accomplishing the same at a filter level.

Additional level of detail provided by searching for and enumerating individual filters instead of categories is also possible using the add-in manager 440. The method 540 may be used by a system process to enumerate all filters belonging to a particular category. The call to the method 540 may need to specify the category by using its unique identifier (ID). Also, filter developers may use the method 550 to install a new filter by providing a category ID, a filter ID, a name, and a description of the filter's functionality. Furthermore, the method 560 may be used to uninstall a filter where the call to the method 560 specifies a filter ID. Additionally, the method 570 may be used by a system process to get information about a particular filter and decide whether to use the filter to extend its own capabilities.

In order to ensure security of a system, processes that call methods to uninstall or delete a category (530) or a filter (560) may need to provide the add-in manager 440 with an appropriate security token. The filter developers (e.g., driver related filters designed to work with particular devices) may also use the add-in manager 440 to restrict the use of a particular private category or unique filter to a particular device or application and thus, prevent its use by other applications or other devices.

Figure 6:
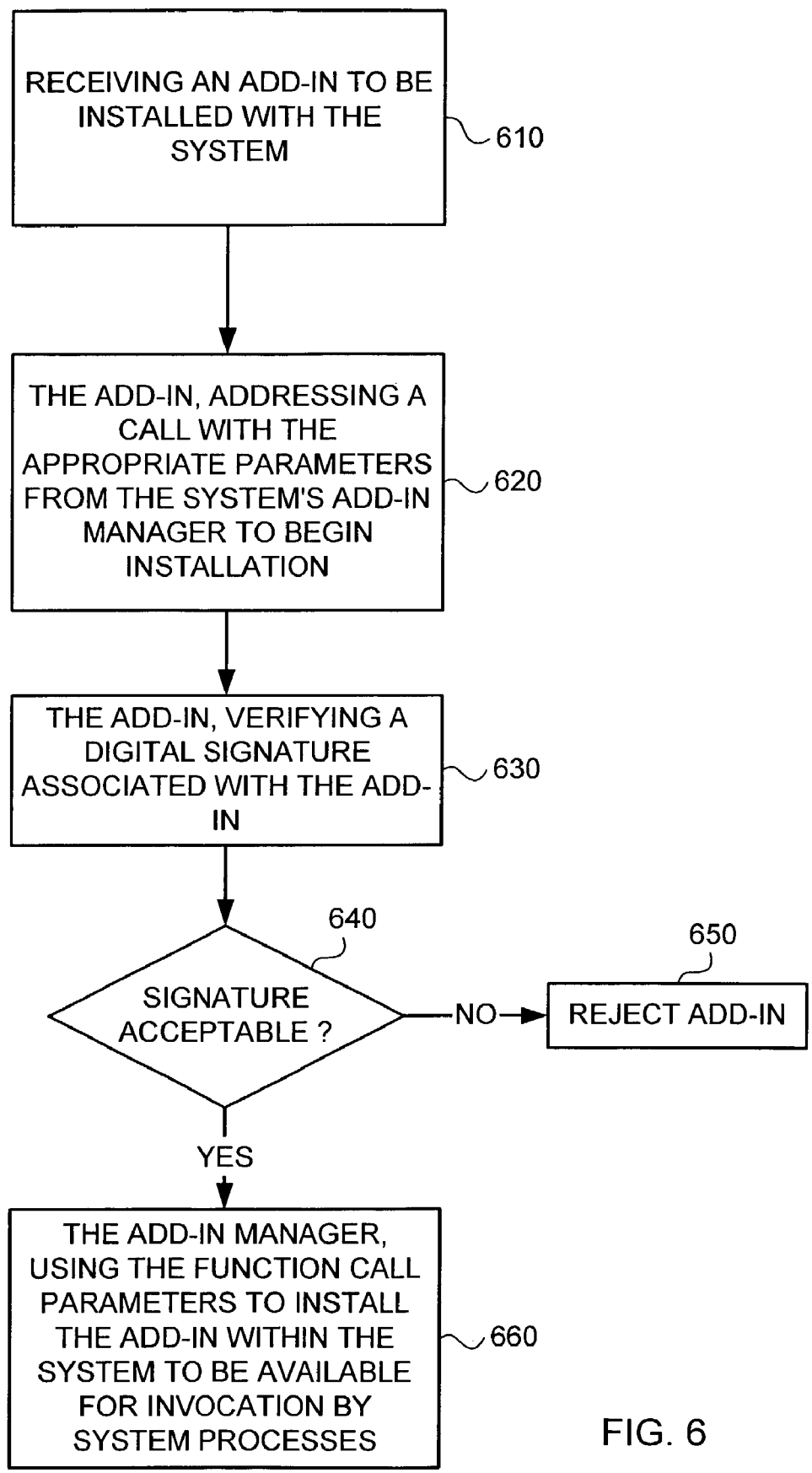
FIG. 6 is a flow chart describing a method for automatically installing add-in filters within a system to be later invoked by system processes.

Exemplary Process for Installing an Add-in Filter to be Dynamically Invoked by a System Process The description related to FIG. 5 above briefly discussed a method 550 for installing filters on system. FIG. 6 illustrates the process of installing a filter with additional detail. At 610, the system receives an add-in to be installed on a system. The add-in filter may be a software component object, which can be provided along with related device drivers, with installation of new applications etc. It is also possible to post an add-in filter on a server on a network such that the users can access the server and download the add-in filters at their own convenience. Whatever the method of receiving an add-in filter, the filter developers themselves should be familiar with the add-in manager interface (e.g., FIG. 5) in order to use the methods described above to install their filters into the system. Thus, at 620, the add-in filter uses the add-in manager interface to address a call from the add-in manager to begin the installation of a filter. The filter provides the add-in manager with its category ID, its filter ID, its name and a description. Then at 630, the add-in manager verifies that the filter being added is a trusted filter. The filter being added is provided with a digital signature which the add-in manager recognizes as being trustworthy. At 640, if the signature is not acceptable, then, at 650, the add-in manager rejects the filter being added. However, at 640, if the signature is acceptable, the filter being added is verified to be trustworthy. Then at 660, the add-in manager uses the parameters provided by the add-in filters to install them on the system. If the add-in filters being added do not belong to a standard filter category or any category that the system is already familiar with then the caller to add-in manager may need to add a category (510) to the registry prior to installing any of its associated filters.

Figure 7:
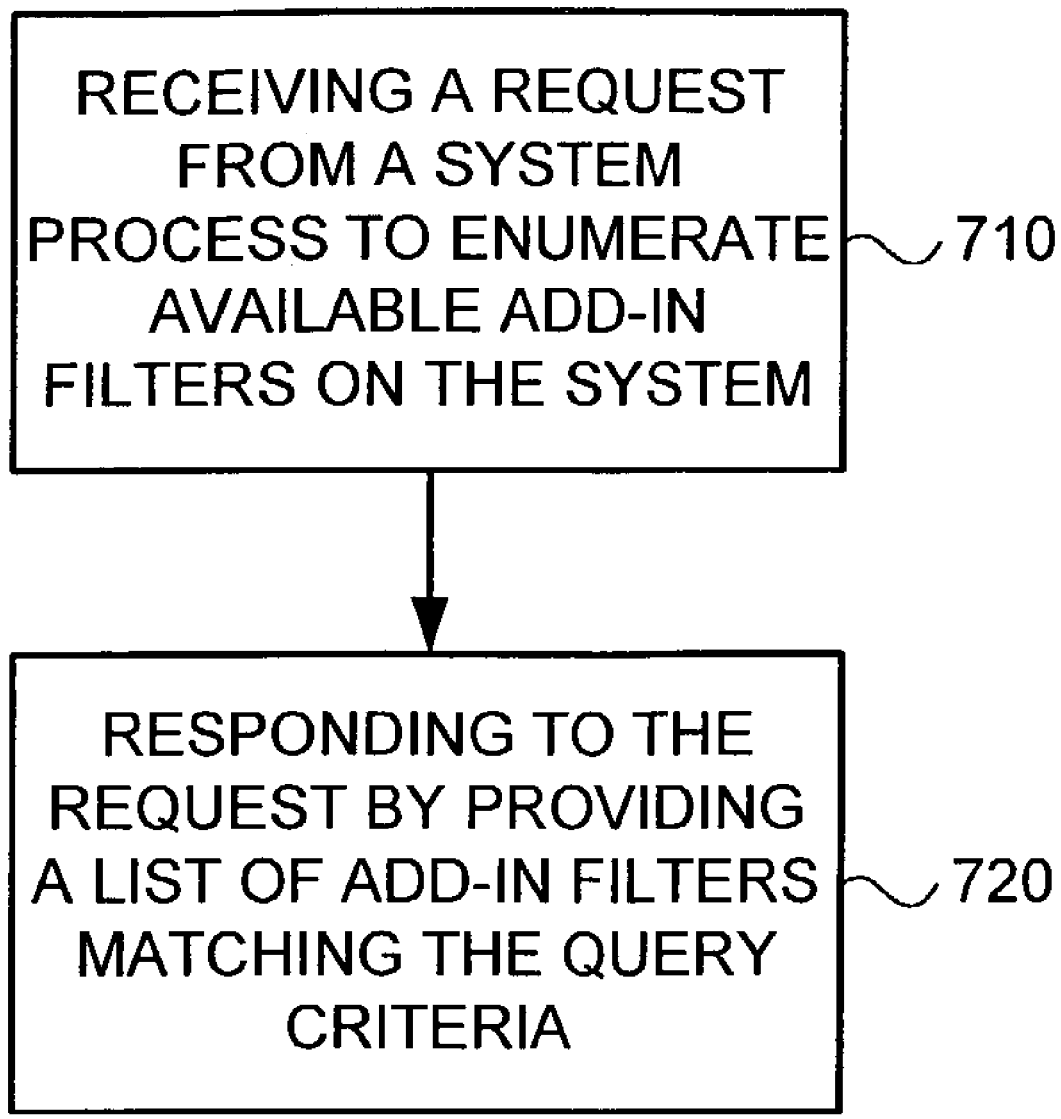
FIG. 7 is a flow chart describing a method for add-in manager service to process a request for enumeration of add-in filters within a system.
Figure 8:
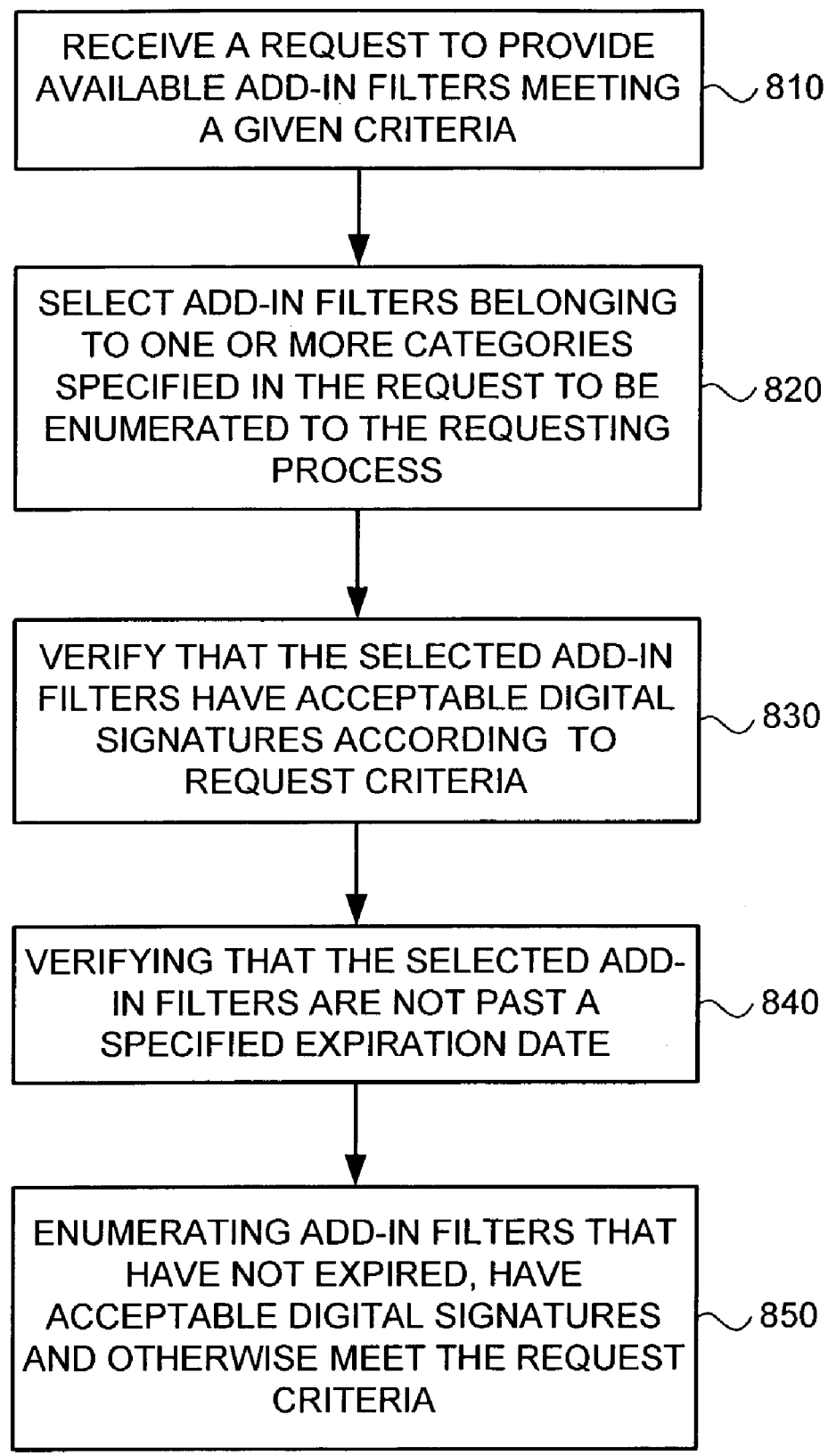
FIG. 8 is a flow chart describing a method for add-in manager service to process a request for enumeration of add-in filters within a system according to provided criteria.

Exemplary Process Related to Searching for and Enumerating Add-in Filters on a System Once the filters are installed, as described above with reference to FIG. 6, they may be enumerated and provided to system processes to extend their capabilities. FIGS. 7 and 8 describe such an overall process. At 710, the add-in manager receives a request from a system process to enumerate a list of add-in filters available on the system that meet criteria provided by the calling process. Once the add-in manager receives the request to enumerate, then at 720, it responds to the request by enumerating a list of add-in filters, which is provided to the calling process.

The criteria for selecting filters to be enumerated may be as simple as the list of filters belonging to one or more filter categories (e.g., 540). The criteria may also be more elaborate such as requesting the enumeration of filters that have digital signatures associated with a particular trustworthy entity. FIG. 8 illustrates a process for enumerating add-in filters available on a system based on an exemplary set of criteria. At 810, the add-in manager receives a request from a process to enumerate add-in filters. At 820, the add-in manager identifies all filters belonging to categories specified in the request from the process. Later, at 830, the add-in manager verifies that the selected filters have one or more of the digital signatures specified by the requesting process. For example, applications by Microsoft® Corporation may only want to use add-in filters that have digital signatures that Microsoft® has validated and approved. Furthermore, at 840, the add-in manager verifies that the selected filters are not past a certain expiration date associated with the filter. This may be useful if the filter was loaded on the system on a trial basis by a user who is yet to purchase a valid license for the filter. Thus, at 850, only the filters that meet all the criteria specified by a process (e.g., category ID, acceptable digital signatures, expiration date etc.) are enumerated. More elaborate criteria may also depend on the name or description of the installed filters. However, the more elaborate the filter the less efficient the process of enumeration may be. Also, one or more of the criteria may be set by one or more of the add-in manager, the add-in filter and the operating system.

Exemplary Process for Selecting and Using Add-in Filters Available on a System

Figure 9:
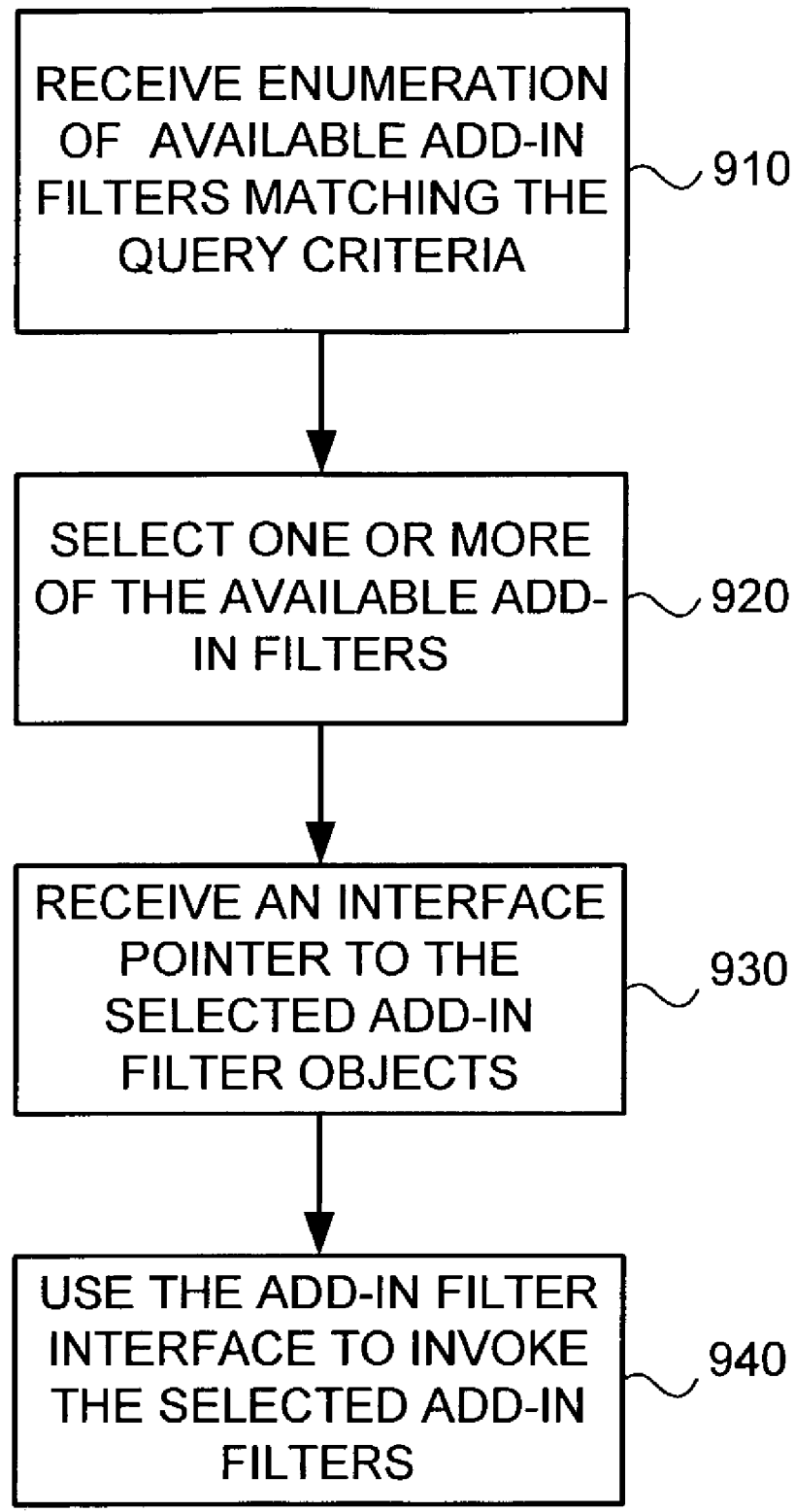
FIG. 9 is a flow chart describing a method for a system process to select one or more filters enumerated by an add-in filter and using the selected filter to extend its own media processing functionalities.

Once the add-in manager enumerates a list of filters in response to a request by a process, the process can use the add-in filter to extend its own capabilities. As shown in FIG. 9, at 910, the process requesting enumeration of add-in filters receives or accesses the enumerated add-in filter list or table. Then at 920, the process requesting enumeration selects one or more of the available add-in filters. Then at 930, the process requesting enumeration receives an interface pointer to the selected add-in filter object. Then at 940, the process uses an interface to the add-in filter to invoke the filter and its associated methods to process selected media data. It may also be advantageous to have the process request or instruct the add-in manager to invoke the filter, instead of the process directly invoking the filter. This would allow the process requesting to use the add-in filters to be separated from the filter process and thus less likely to be vulnerable to any errors within the filter.

The list of enumerated filters may be displayed to a user through an application or acquisition software user interface, allowing the user to select a filter from the list. However, it may not always be necessary or useful to provide such a list to the user. In such an event, the applications or other system processes may automatically select from the list of enumerated add-in filters.

Figure 10:
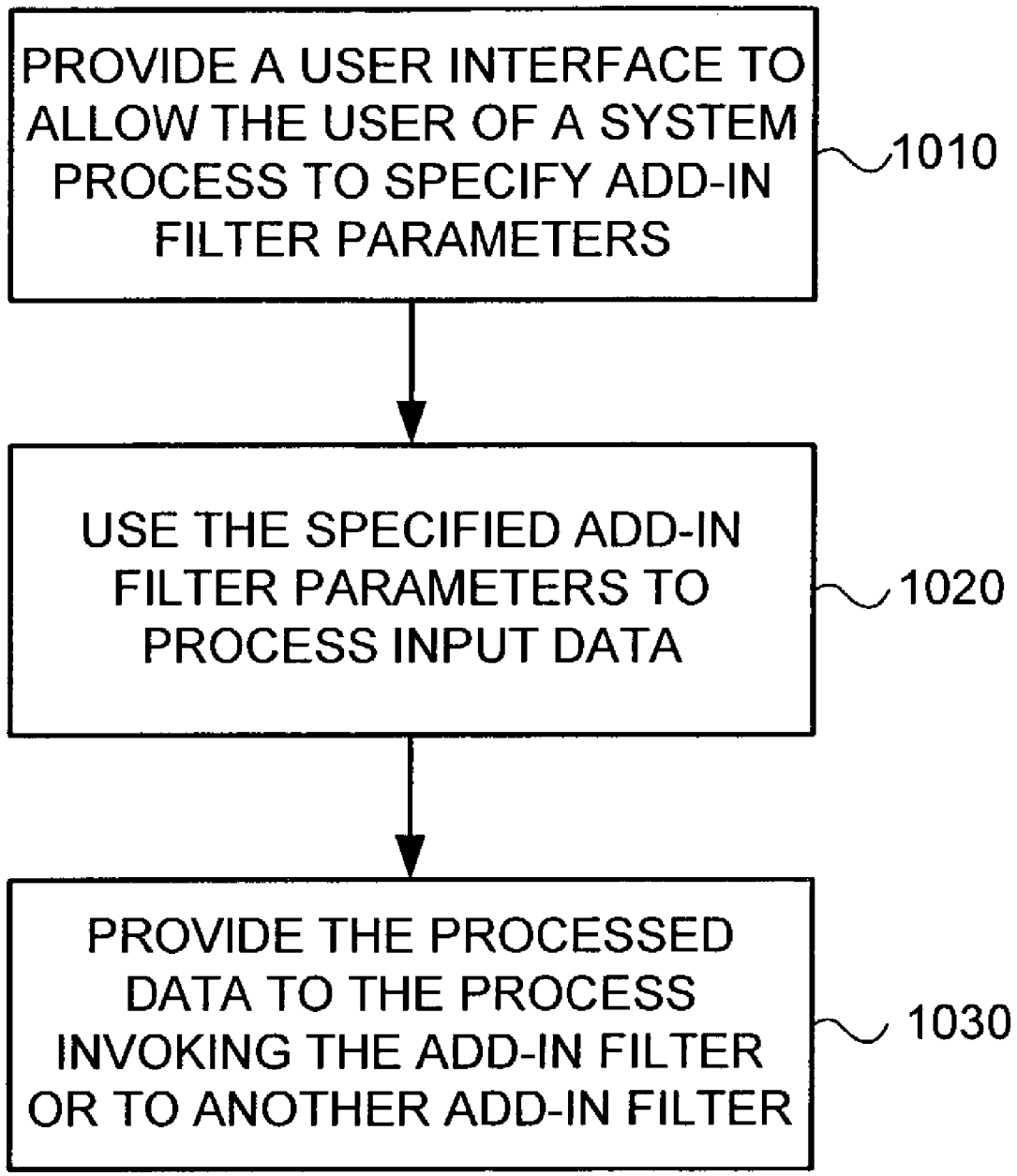
FIG. 10 is a flow chart describing a method for an add-in filter to respond to invocation by a system process upon being selected by the process to extend its media functionalities.
Figure 11:
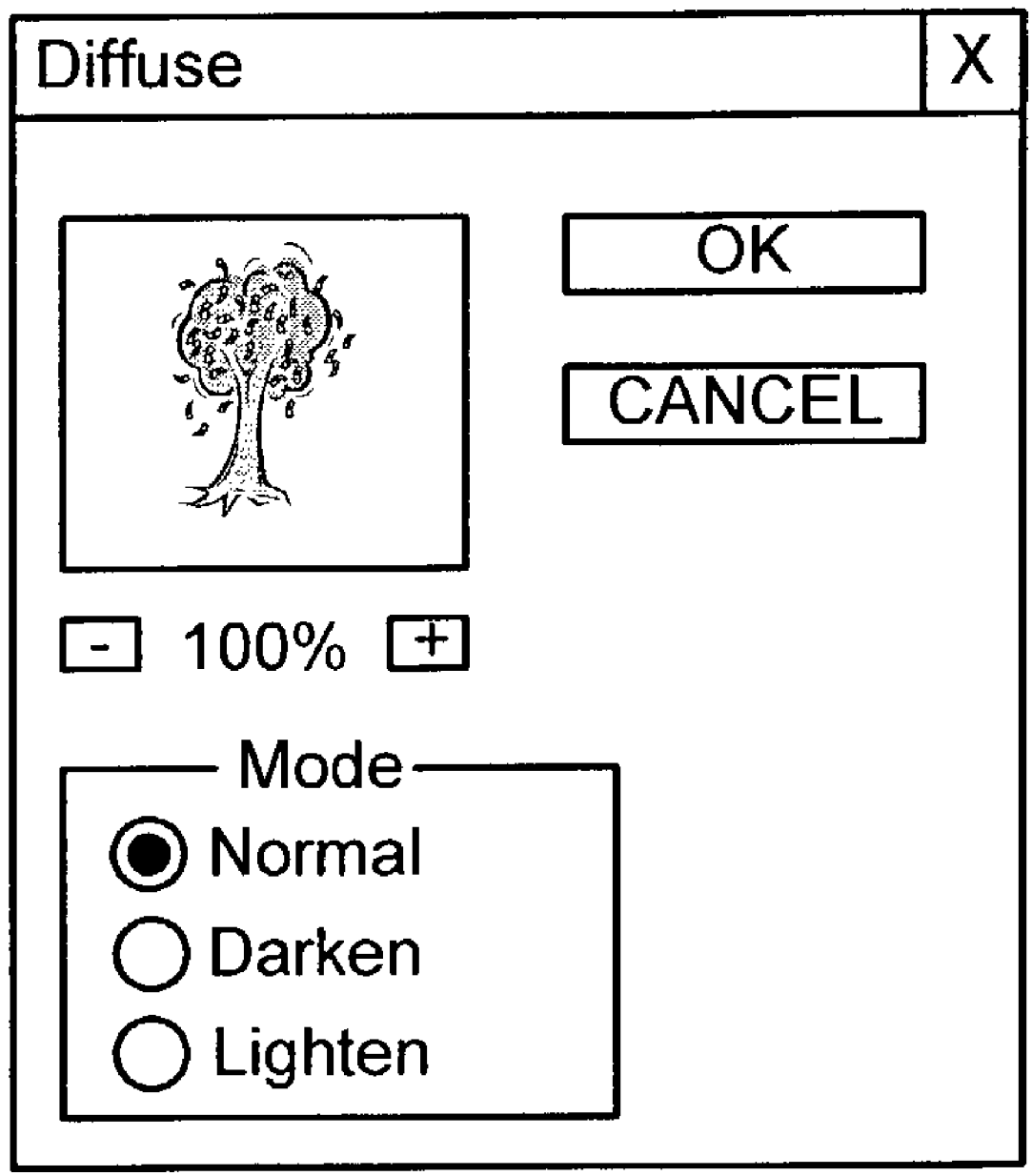
FIG. 11 is a user interface provided by the add-in filter to receive one or more of its processing parameters from a user.

Once the process invokes a selected add-in filter to process the media data, the process or the add-in manager (as the case may be) may hand control of the processing to the filter itself. As shown in FIG. 10, at 1010, the add-in filter may provide a user interface for a user to enter parameters for processing media data. FIG. 11 illustrates one such example of a user interface related to entering user defined parameters for a diffuser effect filter. Alternatively, the filter's functionality may not require any user input or even any process parameters (e.g., some analysis filters only require media data as input and can provide one or more meta data as output). At 1020, the add-in filter uses the specified parameters to process the media data. Then at 1030, the add-in filter provides the processed data to the process invoking the add-in filter or another filter to continue processing the media data. The processed data may then be provided to a render target such as a display or a speaker.

Exemplary Security Model for a System for Installing and Invoking Add-in Filters The system architecture of FIG. 4, which allows system processes to extend their capabilities by using add-in filters, is open and flexible. This is advantageous to the extent that such an open and flexible architecture allows a user to add customized media processing components to their desktop. However, this also makes a system vulnerable to errors and bugs that may reside within an add-in filter provided by an ISV, IHV or 3$^{rd}$ party. Makers of operating system software or applications have always been wary of allowing the user to extend their processes by using components provided by other parties due to this increased security risk. However, as described above, some of these fears may be addressed by requiring add-in filters to be provided along with digital signatures that can validate their security compliance. For example, the add-in manager can be configured to require all add-in filters to provide one or more approved digital signatures (see e.g., 630). Also, even after an add-in filter is approved to be installed within a system, processes requesting add-in filters can specify additional security criteria to the add-in manager such that only those filters meeting such criteria are enumerated for selection (see e.g., 830).

Figure 12:
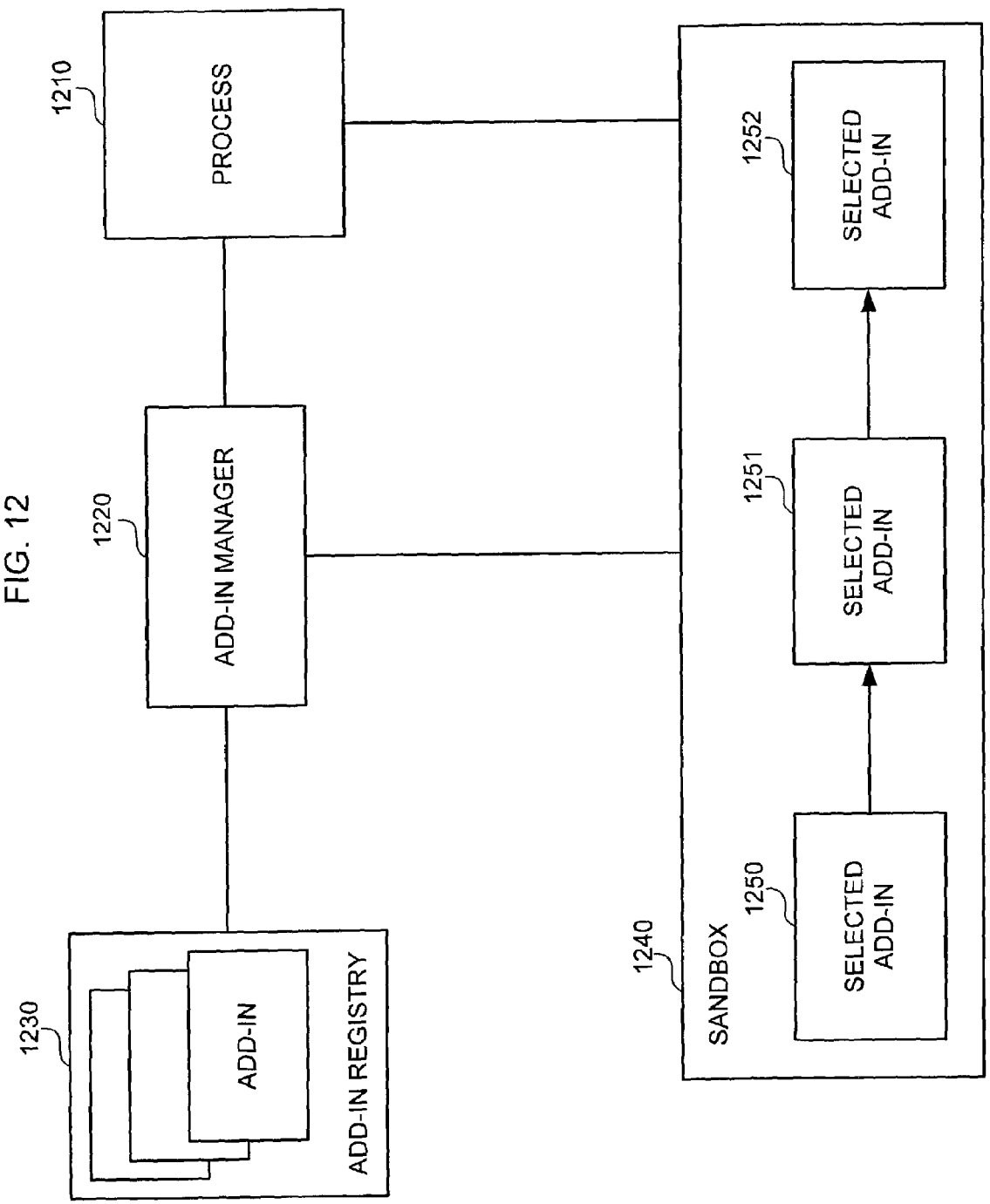
FIG. 12 is a block diagram illustrating a method of ensuring security of a process invoking an add-in filter by separating a distrusted filter from the process invoking the filter object.
Figure 13:
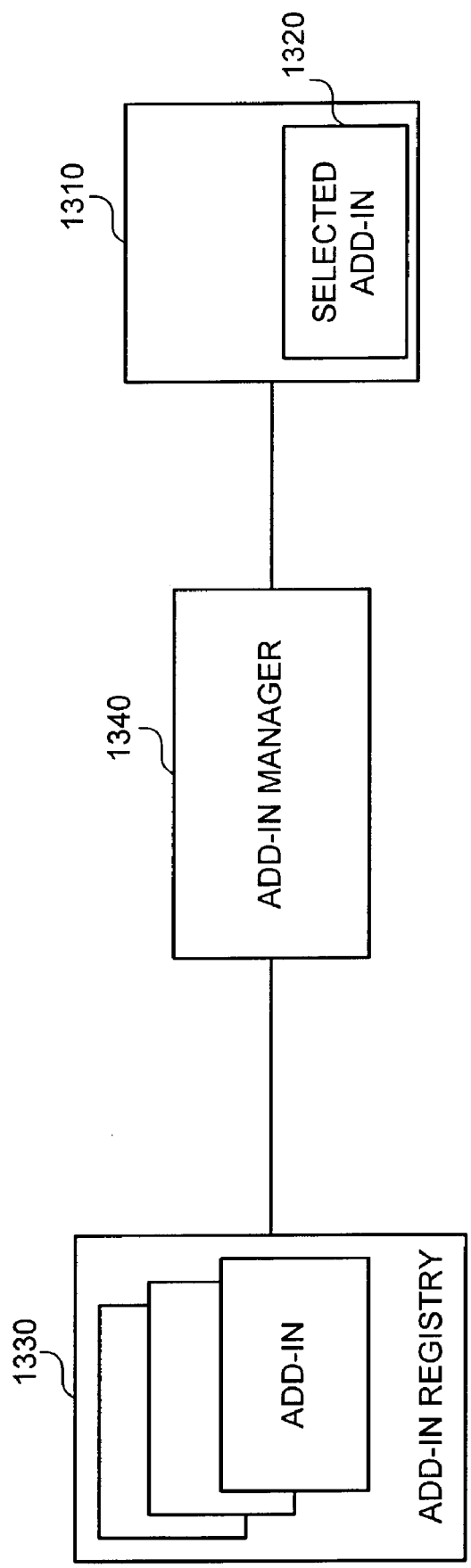
FIG. 13 is a block diagram illustrating a method of allowing a trusted filter object to be invoked from within a system process.

Additionally, FIGS. 12 and 13 illustrate yet another security mechanism to shield processes from any errors or bugs within add-in filters used to extend their capabilities. As shown in FIG. 12, the process 1210 may request the add-in manager 1220 to enumerate a list of available add-in filters 1230. The process can also request the add-in manager 1220 to identify the digital signatures associated with each of the add-in filters. Those filters that cannot provide one or more of certain approved digital signatures can be placed in sandbox 1240 such that the selected filters 1250, 1251 and 1253 may be used outside of the process 1210. Thus, the process 1210 can be isolated from the selected filters 1250, 1251 and 1253 so that any errors or bugs within the filters cannot cause the process 1210 to fail during operation. However, the process 1210 will still be able receive output of the filters 1250, 1251 and 1253.

The sandboxing approach as shown in FIG. 12 can result in markedly reducing the speed of processing media files. Therefore, under certain circumstances, it may also be beneficial for the filter to be used within the process 1210 itself. FIG. 13 illustrates a selected add-in object 1320 being invoked and used within a process 1320. Although, this typically results in faster processing it also presents the risk of the process 1310 failing as a result of the errors within the add-in filter 1320. Therefore, the add-in manager 1340 may be used to verify the digital signatures of add-in filters such that only filters that present approved signatures 1320 can be invoked and used within the process 1310. Otherwise, the add-in filters may be placed outside of the process 1310 as shown in FIG. 12. For example, if an application receives verification of a filter's trustworthiness from the add-in manager 1340 the application process 1310 can load the filter to be invoked through its own user interface. Such an arrangement will allow filter developers to advertise their own brands even when being used within another entity's software.

Exemplary Characteristics of the Add-in Filters to be Used to Dynamically Extend the Capabilities of System Processes The add-in filters used by an add-in manager to extend the capabilities of a process (as enabled by the system architecture of FIG. 4) may need to have certain standard functionality to work effectively with the add-in manager and system processes. For instance, add-in filters are capable of receiving multiple types of input and providing multiple types of output. One such filter is a stitching filter which can take multiple images and produce one output image. Also, a document scanning filter can take one image in and produce multiple output types such as images and text data. Examples of filters that provide output data other than images include annotation generators and image measurement filters. An annotation generator might extract data such as the date from a date stamp on the image, or whether or not there are people in an image. An image measurement filter can produce a histogram or measure aspects of a preview scan image to be used for setting scan parameters.

Figure 14:
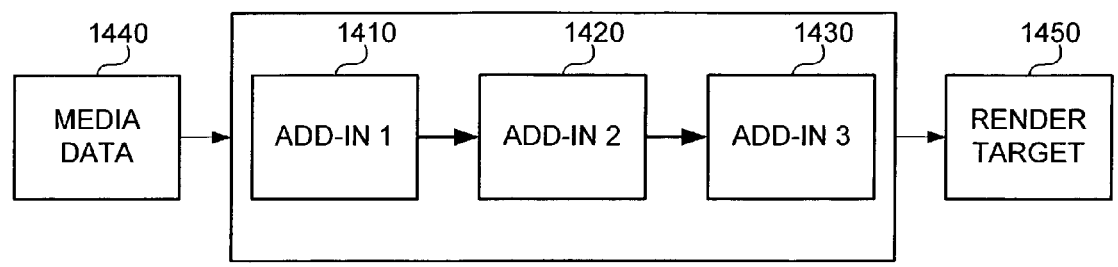
FIG. 14 is a block diagram illustrating add-in filters associated in a chain to consecutively process media data.

Furthermore, add-in filters should have the capability of receiving their input from another filter object and also providing their output to another filter object. As shown in FIG. 14, the add-in filters 1410, 1420, and 1430 can be associated in a chain so that media data 1440 can be processed using multiple filters 1410, 1420 and 1430 at once. Otherwise, each of add-in filters 1410, 1420 and 1430 have to be processed separately and rendered and then processed again by another filter. This can be time consuming. With the capabilities of the filters to be associated in chain, the add-in manager can enumerate several filters and the applications can select multiple effect filters at once to extend their capabilities.

Figure 15:
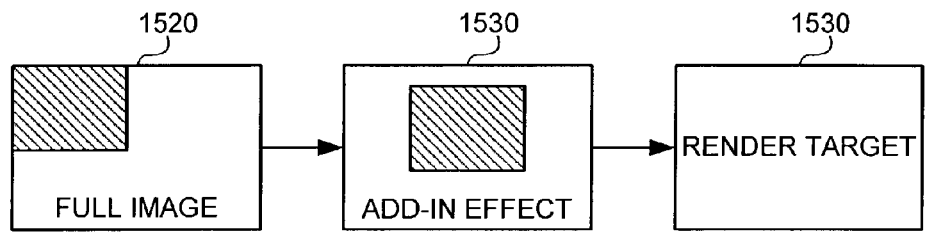
FIG. 15 is a block diagram illustrating add-in filters receiving selected parts of media data and processing the received parts and outputting the processed parts while continuing to receive more pats of the media data.

Yet another feature of the add-in filters is illustrated in FIG. 15. Generally, filters are capable of processing only parts of a full input of media data. For example, with regards to image processing, filters such as add-in effect filter 1510 are capable of receiving part of a full image (e.g., identified by their coordinates), processing that selected part and outputting it to a render target 1530. In this manner, as an image is being manipulated by an application through a filter, an original view of the image can persist as part of the image is being changed by the effect. This will allow the application to provide the user with near instantaneous view of the effect of an add-in. If for instance the effect is not desirable the add-in may be deselected. Although, FIG. 15 uses an example of an image file for illustrating this filter feature other media (e.g., audio or video) can be processed in the same manner with their respective filter types.

Figure 16:
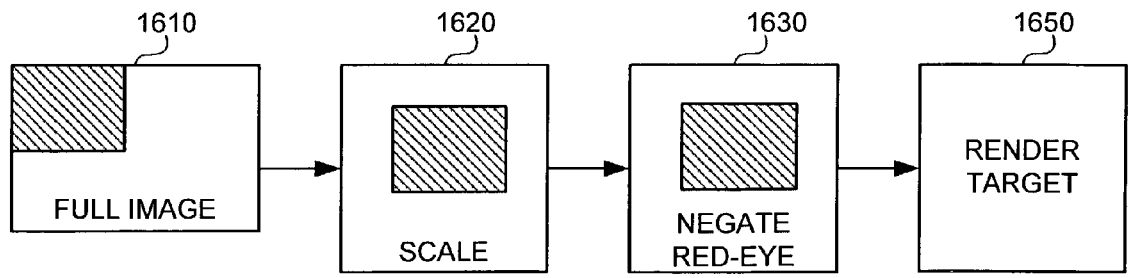
FIG. 16 is a block diagram illustrating multiple add-in filters with multiple functionalities processing parts of a media file consecutively.

As shown, in FIG. 16 the feature of associating add-in filters in a chain (FIG. 14) and the feature of processing part of a media file can be combined to associate multiple filters in a chain and to view or hear the effect of add-in filters as parts of the input file are being processed. For instance, part of a full image at 1610 can be scaled at 1620 and then the selected part may be negated at 1630 to remove a red-eye before rendering the image at 1640.

Alternatives

The methods and systems describe functionality of several system components such as the system service add-in manager, the add-in filters and system processes. It should be understood that the functionality ascribed to any one these and other components described above can also be performed by any of the other related components if they are programmed to do so.

Also, examples discuss processing of particular type of media (e.g., video, audio, images etc.), however, concepts underlying the example are equally applicable to all forms of media data. In view of the many possible embodiments, it will be recognized that the illustrated embodiments include only examples and should not be taken as a limitation on the scope of the invention. Rather, the invention is defined by the following claims. We therefore claim as the invention all such embodiments that come within the scope of these claims.

We claim:

1. A method of managing media filters, the method implemented on a computer, the computer having an operating system with a system level service add-in manager for installing media filters, the method comprising:

an process with one or media filters to install instantiating the system level service add-in manager to install the one or more media filters;

the system service add-in manager receiving a request for installation from the process with one or media filters to install, the request comprising a call to the system service add in manager, the call comprising filter installation parameters, the filter installation parameters including a filter ID and a category ID;

upon receipt of the request, the system service add-in manager installing the one or more media filters using the filter ID and at least a portion of the other filter installation parameters; and a process using an interface to the system service add-in manager to instantiate at least one of the one or more installed media filters to extend the process to process media data using the at least one of the one or more installed filters.

2. The method of claim 1, wherein the request for installation comprises one or more of the following:

one or more unique identifiers corresponding to categories associated with the media filters;

one or more unique identifiers corresponding to the media filters;

one or more descriptions of the media filters; and one or more digital signatures associated with the media filters.

3. The method of claim 1, wherein at least one media filter is installed for use by a first process in a first entity and can be accessed by a second process in a second entity.

4. The method of claim 1, wherein the one of the one or more filters invoked is not installed within the process.

5. The method of claim 1 wherein the system process comprises a device driver or an application.

6. A method of managing media filters, the method implemented on a computer system having an operating system with a system level service for installing and enumerating media filters, the method comprising:

an application associated with one or more filters to be installed, the application instantiating the system level service and the one or more filters to be installed;

the system level service receiving a request to install one or more media filters, the request including one or more parameters, the one or more parameters including a globally unique filter id to provide location for each filter to be installed, one or more digital signatures for each filter to be installed, and a category for each filter to be installed;

the system level service installing the one or more media filters using the globally unique filter id for each filter to be installed to locate each filter, and using at least one other of the one or more parameters received from the one or more media filters to install the filter;

subsequent to the installing, the system level service receiving a request from a system process requesting enumeration to enumerate one or more of the installed media filters, the request including at least one category;

the system level service enumerating the installed media filters belonging to the category;

if at least one digital signature from a given enumerated media filter is not an approved digital signature, then placing the given enumerated media filter in a sandbox outside the system process requesting enumeration; and the system process requesting enumeration, using an interface to the system level service to invoke the given enumerated media filter that cannot provide the at least one approved digital signature to process media data outside of the system process requesting enumeration so that an error within the given enumerated media filter will not cause the system process requesting enumeration to fail during operation.

7. The method of claim 6, wherein the each of the categories correspond to a unique system wide identifier and the request from the system process to enumerate the filters comprises the unique system wide identifier.

8. The method of claim 6 further comprising, determining acceptability of the one or more digital signatures associated with the one or more media filters prior to installing the filters.

9. The method of claim 6 further comprising, determining acceptability of the one or more digital signatures associated with the filters prior to enumerating the installed filters.

10. The method of claim 9 further comprising, separating from the system process requesting enumeration of the installed filters those filters that are determined to have unacceptable digital signatures.

11. The method of claim 9, wherein acceptability of the installed filters for enumeration is determined according to criteria received from the system process requesting enumeration.

12. The method of claim 9, wherein acceptability of the installed filters on the system process requesting enumeration is determined according to criteria received from one or more of the following:
the system process requesting enumeration;
the installed filters; and
the operating system.

13. A computer readable medium comprising computer-executable instructions for performing the method of claim 6.

14. The method of claim 6, wherein at least two of the one or more installed media filters are connected together in a chain and input media data is processed consecutively by the media filters in the chain.

15. The method of claim 6, wherein any one of the media filters may be used by multiple processes at once.

16. In a computer system, the computer system comprising a processor and memory, the memory storing an operating system with a media filter management system service, the media filter management service comprising:
code for instantiating the media filter management system service by a system process with media filters to be installed;
code for the media filter management system service to receive requests from the system process to install the media filters, the requests including a unique identifier for each media filter to be installed, and a category for each media filter to be installed;
code for the media filter management system service to install the media filters using the unique identifier for each media filter to locate the media filter to produce installed filters;
code for the media filter management system service to receive requests from system processes in the computer system to enumerate the installed filters, the request including at least one category;
code for the media filter management system service to discover and enumerate the installed filters with the category included in the request for at least some of the installed filters to produce enumerated filters;
code for the system process in the computer system, using an interface to the media filter management system service to invoke one of the enumerated filters to process media data; and
code for the media filter management service to process the media data outside of the system process using the invoked enumerated filter.

17. The filter management service of claim 16 further comprising, code for the media filter management system service to determine validity of the media filters prior to installing the media filters.

18. The filter management service of claim 16 further comprising, code for the media filter management system service to select the filters to be enumerated according to criteria specified by the system processes requesting enumeration of the filters.

19. The filter management service of claim 16 further comprising, code for the media filter management system service to select one or more of the enumerated filters to be invoked as a process separate from the system processes requesting enumeration.

20. A method of customizing an extensible media related computer system process operative on a computer having an operating system and a filter management service for enumerating media related filters installed on the computer, the media related filters having digital signatures, and a brand, the method comprising:
the filter management service receiving a request from the system process to enumerate the media-related filters installed on the computer matching one or more criteria, one of the one or more criteria being if the media related filters presented digital signatures of an approved type during installation of the media related filters;
the filter management service enumerating the media related filters that presented the digital signatures of the approved type;
the system process selecting one or more of the enumerated media related filters, the one or more selected filters not installed within the system process;
the system process loading the one or more enumerated media related filters using an interface associated with the system process; and
the system process using the one or more loaded filters to process media related data such that at least one brand of the enumerated media related filters is advertised on a display screen controlled by the system process.

21. The method of claim 20 further comprising, verifying that the system process has proper authority to use the one or more selected media related filters.

22. A computer readable medium comprising computer-executable instructions for performing the method of claim 20.

23. The method of claim 20, wherein the system process is one of the following:
a media processing software application;
a device driver; and
a media related acquisition software.

24. A method of installing a media related filter on a computer system associated with a operating system having a system level service for installing media filters, the method comprising:
a system process with the media related filter to be installed instantiating the system level service;
the system level service requesting an add-in manager of the system level service to install the media filter on the computer system;
the system level service add-in manager instructing the media filter to provide the system level service add-in manager with information related to the media filter, the information comprising a category ID, a global filter ID, a name, and a description;
the system level service add-in manager adding a category corresponding to the media filter category ID to a category registry located on the computer system;

the system level service add-in manager installing the media filter on the computer system using at least a portion of the information related to the media filter;

a process on the computer system requesting the system level service add-in manager to enumerate media filters installed on the computer system based on at least one category in the category registry;

the system level service add-in manager enumerating the media filters based on the at least one category in the category registry;

the process on the computer system, using an interface to the system level service add-in manager, selecting an enumerated media filter; and the process on the computer system invoking the selected media filter outside of the process on the computer system so that an error within the selected media filter will not cause the process on the computer system to fail during operation;

wherein the selected media filter can receive its input from a media filter A and provide its output directly to a different filter B as directed by the process on the computer system, and wherein the selected media filter is not installed within the process on the computer system.

25. A computer readable medium comprising computer-executable instructions for performing the method of claim 24.

26. The method of claim 24 further comprising the system level service add-in manager deleting the category and all media filters associated with the category.

27. A method of managing media filters, the method implemented on a computer system having an operating system with a system level service for installing and discovering media filters installed on the computer, the method comprising:

an installing process with one or more media filters to be installed instantiating an add-in manager associated with the system level service and the one or more media filters;

the system level service add-in manager receiving a request from the installing process to install the one or more media filters on the computer system; the one or more media filters providing the system level service add-in manager with a category ID, a global filter ID, a name, and a functionality category;

the system level service add-in manager installing the media filters on the computer system, using the global filter ID to locate the filter, the installing comprising categorizing the media filters by their functionality category;

the system level service add-in manager receiving a request from a requesting process to discover media filters installed on the computer system of a given functionality category;

the system level service add-in manager discovering the media filters installed on the computer system of the given functionality category;

the process selecting one or more of the discovered media filters;

the system level service add-in manager receiving at least one interface pointer to at least one of the one or more discovered media filters; and the system level service add-in manager using the at least one interface pointer to invoke at least one of the one or more discovered filters for the requesting process, the at least one of the one or more discovered filters not installed in the requesting process.

28. In a computer system, the computer system comprising a processor and memory, the memory storing one or more system processes and an operating system, the operating system having a system level service for installing and enumerating media filters, wherein the system processes include calls to expose a programming interface related to the system level service for installing and enumerating media filters, the interface comprising:

code for a system process with a media filter to install to expose the programming interface related to the system level service;

code for the system process to use the exposed programming interface to instantiate the system level service;

code for the system process to use the exposed programming interface to pass information to the system level service about the media filter, the information including filter category ID, expiration date, and digital signature;

code for the system level service to install the media filter on the computer system, the installation including code for placing the media filter in at least one category based on the category ID; code for associating the expiration date with the media filter; and code for associating the digital signature with the media filters code for an enumerating process to expose the programming interface;

code for the enumerating process to use the exposed programming interface to signal to the system level service to enumerate one or more filters installed on the computer system; wherein the one or more filters are enumerated according to a criterion, the criterion comprising at least one of: the category ID, at least one acceptable digital signature, or the expiration date;

code for the system level service to determine if at least one of the one or more enumerated media filters cannot provide the at least one acceptable digital signature;

code for the system level service to place the at least one of the one or more enumerated media filters that cannot provide at least one acceptable digital signature in a sandbox so that an error within the filter will not cause a process invoking the filter to fail during operation;

code for invoking the at least one enumerated filter in the sandbox from the enumerating process using the system level service; and code for at least one filter in the sandbox to receive input from a second filter and provide output to a third filter such that media data can be processed using multiple filters at once.

29. The interface of claim 28 wherein the media filter is installed on the computer system according to a unique identifier related to the digital filter.

30. The interface of claim 28 wherein the media filter corresponds to a filter category and the filter is installed according to the corresponding filter category.

31. The interface of claim 30 wherein the one or more filters installed on the computer system are enumerated according to their corresponding filter category.

32. The interface of claim 30 further comprising code for deleting at least one filter category corresponding to at least one filter associated with the category installed on the computer system.

33. The interface of claim 32, wherein deleting at least one filter category results in deletion of corresponding filters from the computer system.

34. The interface of claim 28 further comprising code for deleting the one or more filters installed on the computer system.

* * * * *

UNITED STATES PATENT AND TRADEMARK OFFICE
CERTIFICATE OF CORRECTION

PATENT NO. : 7,493,614 B2
APPLICATION NO. : 10/404985
DATED : February 17, 2009
INVENTOR(S) : Min Liu et al.

Page 1 of 1

It is certified that error appears in the above-identified patent and that said Letters Patent is hereby corrected as shown below:

In column 11, line 65, in Claim 1, delete "an process" and insert -- a process --, therefor.

In column 12, line 4, in Claim 1, delete "add in" and insert -- add-in --, therefor.

In column 14, line 22, in Claim 20, delete "media-related" and insert -- media related --, therefor.

In column 16, line 62, in Claim 34, before "filters" delete "one or more".

Signed and Sealed this
Third Day of May, 2011

David J. Kappos
*Director of the United States Patent and Trademark Office*